United States Patent
Jorgensen

(12)
(10) Patent No.: US 6,293,447 B1
(45) Date of Patent: Sep. 25, 2001

(54) VEHICLE GUN CARRIER SYSTEM

(76) Inventor: Bret R. Jorgensen, 3405 N. Ohlman, Mitchell, SD (US) 57301

( * ) Notice: Subject to any disclaimer, the term of this patent is extended or adjusted under 35 U.S.C. 154(b) by 0 days.

(21) Appl. No.: 09/461,171

(22) Filed: Dec. 14, 1999

(51) Int. Cl.$^7$ ........................................................ B60R 7/00
(52) U.S. Cl. ........................ 224/275; 224/539; 224/553; 224/571; 224/572; 224/913; 211/64
(58) Field of Search .................................. 224/402, 275, 224/42.11, 539, 553, 571, 572, 913; 211/2, 64

(56) References Cited

U.S. PATENT DOCUMENTS

| | | | |
|---|---|---|---|
| 2,692,069 | * 10/1954 | Winters et al. | 224/275 X |
| 2,775,351 | * 12/1956 | Johnson et al. | 224/913 X |
| 3,361,265 | * 1/1968 | Wernimont | 224/913 X |
| 3,473,673 | * 10/1969 | Porter | 224/275 X |
| 3,477,586 | * 11/1969 | Haluska | 224/913 X |
| 3,477,587 | * 11/1969 | Hart | 224/913 X |
| 3,497,077 | * 2/1970 | Sjostrand | 224/913 X |
| 3,767,094 | * 10/1973 | Sikes | 224/913 X |
| 4,120,436 | * 10/1978 | Burch | 224/913 X |
| 4,131,202 | * 12/1978 | Hansen | 224/275 X |
| 4,579,263 | * 4/1986 | Ehmke et al. | 224/42.24 |
| 4,852,780 | * 8/1989 | Woodbury | 224/42.42 X |
| 5,443,191 | * 8/1995 | Jorgenson | 224/543 |
| 5,799,850 | * 9/1998 | Ryder | 224/539 |
| 5,833,102 | * 11/1998 | Jacobson | 224/275 |

* cited by examiner

*Primary Examiner*—Stephen K. Cronin
(74) *Attorney, Agent, or Firm*—Michael S. Neustel

(57) ABSTRACT

A vehicle gun carrier system for supporting a plurality of elongate guns upon the front seat of a vehicle having a center console or armrest. The inventive device includes a base, a support member pivotally attached to the base, and a first strap and a second strap engageable with the base and positionable about a cover of a center console or a center armrest. The support member as a plurality of cutouts for receiving the stock portion of a gun. A cushion is preferably attached to the cutouts for preventing damage to the gun during operation of the vehicle. The base preferably has a front broad portion and a rear narrow portion for providing maximum stability upon narrow consoles and armrests. A gripping gasket is preferably attached to a lower surface of the base for preventing sliding of the base during operation of the vehicle. The first strap and second strap preferably have an adjustment portion for allowing the base to be secured to various sizes of the center console or center armrest. The support member includes a pair of hinge arms that extend rearwardly to pivotally engage the base. The support member preferably is at an angle with respect to the base when in the upright position and substantially parallel to the base when in the storage position.

17 Claims, 7 Drawing Sheets

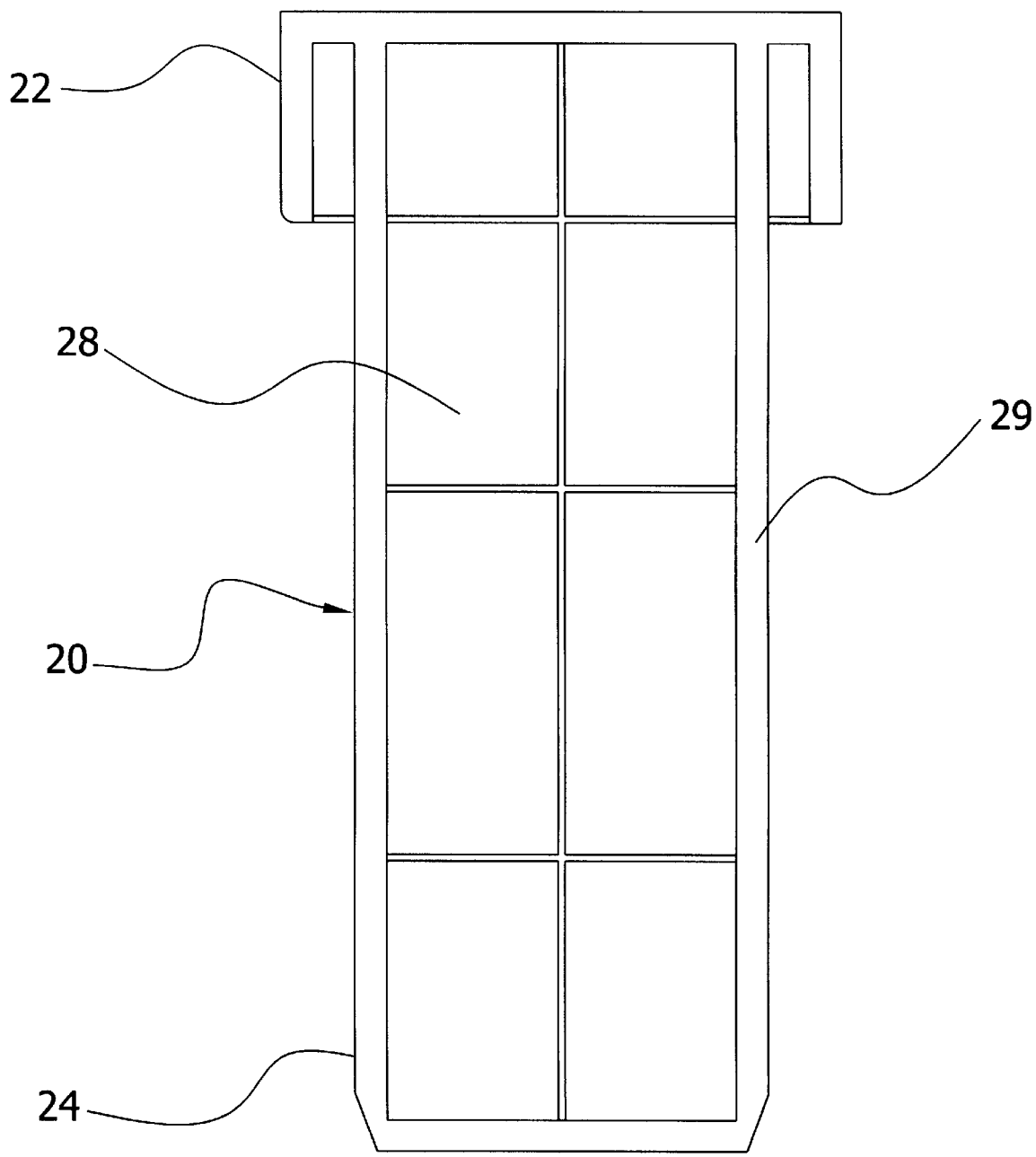

VEHICLE GUN CARRIER SYSTEM

REFERENCE TO RELATED PATENT APPLICATION

Reference is made to United States provisional patent application Ser. No. 60/072,517 filed on Jan. 26, 1998 (abandoned) which is referenced in subsequent U.S. patent application Ser. No. 09/234,241 filed on Jan. 19, 1999 (pending). The named inventor on both patent applications was Bret R. Jorgensen of Mitchell, South Dakota. An Office Action was mailed on Sep. 17, 1999 for the 09/234,241 patent application and a response is due on Dec. 17, 1999. The 60/072,517 provisional application is now abandoned. This patent application is a continuation application from the two above-stated patent applications.

BACKGROUND OF THE INVENTION

1. Field of the Invention

The present invention relates generally to gun support devices and more specifically it relates to a vehicle gun carrier system for supporting a plurality of elongate guns upon the front seat of a vehicle having a center console or armrest.

Hunters often times position their elongate guns, such as rifles and shotguns, in the middle portion of the front seat so they easily retrieve their gun while driving if they spot wild game nearby. When vehicles have a center console or center armrest it is extremely difficult to position the rifle in a desired location upon the seat, so the user often times will position the elongate gun with the barrel positioned by the feet and the stock adjacent the hunters leg during driving. The elongate gun will sometimes interfere with the operation of the vehicle and can be dangerous.

Also, during driving of the vehicle the elongate gun will often times slide upon the seat due to the vibrations of the vehicle. The elongate gun will sometimes become repositioned within the vehicle in a location difficult for the driver of the vehicle to retrieve when required. In extreme situations the elongate gun is placed in a dangerous position for the driver or other occupants of the vehicle if an accidental discharge should occur.

2. Description of the Prior Art

Conventional gun racks have been in use for years. Typically, the gun racks are designed to be inserted into the rear window of a pickup and support opposing ends of the elongate guns. Another type of gun rack on the market positions the gun above the front window of the vehicle using a housing structure with an elongated slot within.

Neither of the prior art gun racks allow for easy retrieval of an elongate gun. In addition, neither of the prior art gun racks allow the elongate gun to be positioned in a convenient location which can be easily accessed quickly upon seeing game.

While these devices may be suitable for the particular purpose to which they address, they are not as suitable for supporting a plurality of elongate guns upon the front seat of a vehicle having a center console or armrest. Conventional gun rests are not designed to be utilized within the front seat of a vehicle. In addition, conventional gun rests do not position the elongate gun in a convenient location to reach the gun for the driver of a vehicle.

In these respects, the vehicle gun carrier system according to the present invention substantially departs from the conventional concepts and designs of the prior art, and in so doing provides an apparatus primarily developed for the purpose of supporting a plurality of elongate guns upon the front seat of a vehicle having a center console or armrest.

SUMMARY OF THE INVENTION

In view of the foregoing disadvantages inherent in the known types of gun rests now present in the prior art, the present invention provides a new vehicle gun carrier system construction wherein the same can be utilized for supporting a plurality of elongate guns upon the front seat of a vehicle having a center console or armrest.

The general purpose of the present invention, which will be described subsequently in greater detail, is to provide a new vehicle gun carrier system that has many of the advantages of the gun rests mentioned heretofore and many novel features that result in a new vehicle gun carrier system which is not anticipated, rendered obvious, suggested, or even implied by any of the prior art gun racks, either alone or in any combination thereof.

To attain this, the present invention generally comprises a base, a support member pivotally attached to the base, and a first strap and a second strap engageable with the base and positionable about a cover of a center console or a center armrest. The support member as a plurality of cutouts for receiving the stock portion of a gun. A cushion is preferably attached to the cutouts for preventing damage to the gun during operation of the vehicle. The base preferably has a front broad portion and a rear narrow portion for providing maximum stability upon narrow consoles and armrests. A gripping gasket is preferably attached to a lower surface of the base for preventing sliding of the base during operation of the vehicle. The first strap and second strap preferably have an adjustment portion for allowing the base to be secured to various sizes of the center console or center armrest. The support member includes a pair of hinge arms that extend rearwardly to pivotally engage the base. The support member preferably is at an angle with respect to the base when in the upright position and substantially parallel to the base when in the storage position.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a vehicle gun carrier system that will overcome the shortcomings of the prior art devices.

A second object is to provide a vehicle gun carrier system for supporting a plurality of elongate guns upon the front seat of a vehicle having a center console or armrest.

Another object is to provide a vehicle gun carrier system that stores an elongate rifle or shotgun in a convenient location of a vehicle.

An additional object is to provide a vehicle gun carrier system that reduces the likelihood of a rifle or shotgun becoming accidentally repositioned within a vehicle during travel.

A further object is to provide a vehicle gun carrier system that is attachable to various sizes of center consoles and center armrests of vehicles.

Another object is to provide a vehicle gun carrier system that may remain attached without interfering with the normal operation of the vehicle.

An additional object is to provide a vehicle gun carrier system that is small, compact, lightweight and versatile for many models of vehicles.

Another object is to provide a vehicle gun carrier system that can easily be attached or removed from a vehicle.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 7 is a bottom view of the present invention showing the gripping gasket positioned to the lower surface of the base adjacent the base perimeter.

DESCRIPTION OF THE PREFERRED EMBODIMENT

Figure 1:
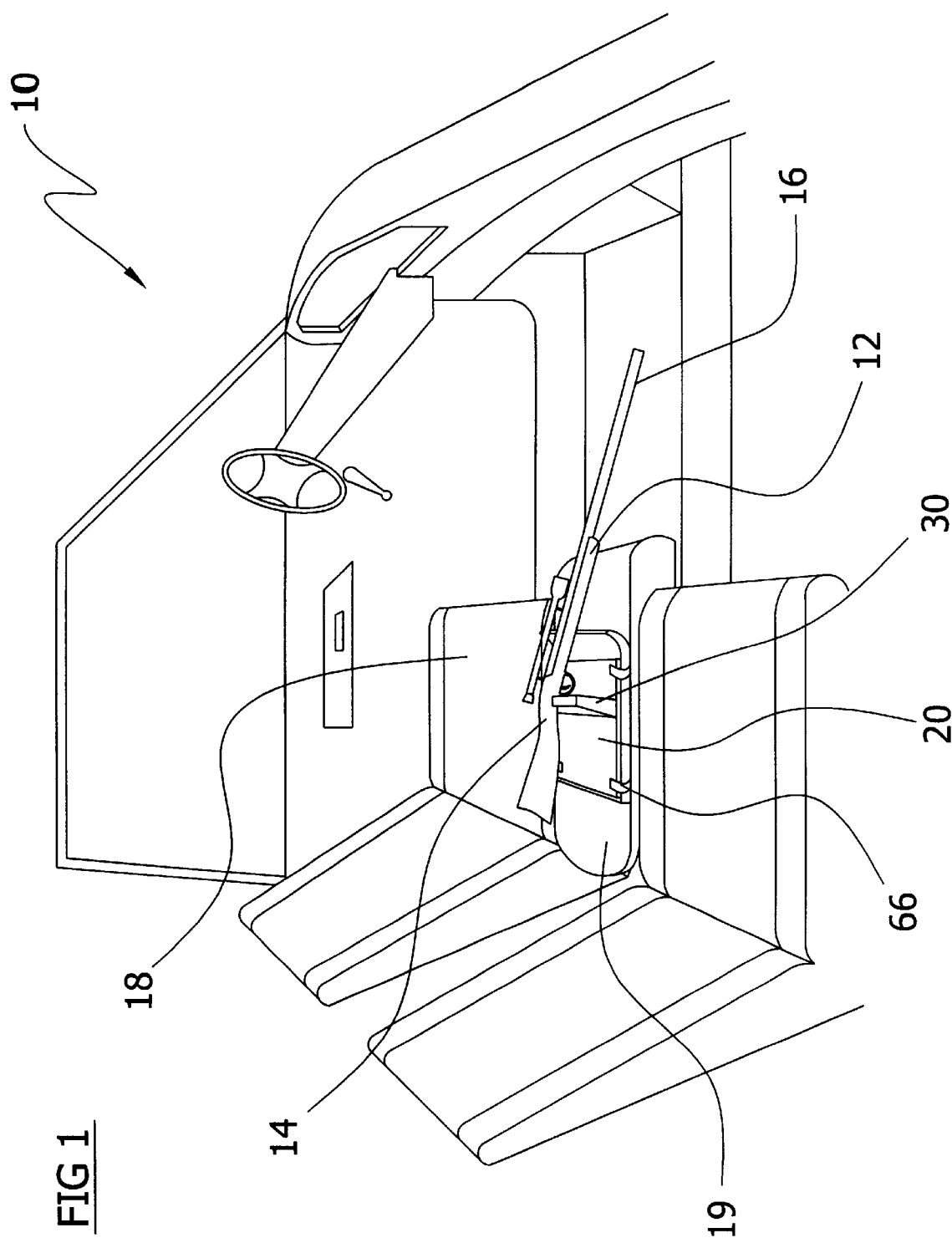
FIG. 1 is an upper perspective view of the present invention supporting a rifle.

Turning now descriptively to the drawings, in which similar reference characters denote similar elements throughout the several views, FIGS. 1 through 7 illustrate a vehicle gun carrier system 10, which comprises a base 20, a support member 30 pivotally attached to the base 20, and a first strap 60 and a second strap 66 engageable with the base 20 and positionable about a cover of a center console 19 or a center armrest of the front seat 18 of a vehicle. The support member 30 as a plurality of cutouts 34 for receiving the stock 14 portion of a gun 12. A cushion 40 is preferably attached to the cutouts 34 for preventing damage to the gun 12 during operation of the vehicle. The base 20 preferably has a front broad portion 22 and a rear narrow portion 24 for providing maximum stability upon narrow consoles and armrests. A gripping gasket 29 is preferably attached to a lower surface 28 of the base 20 for preventing sliding of the base 20 during operation of the vehicle. The first strap 60 and second strap 66 preferably have an adjustment portion 64 for allowing the base 20 to be secured to various sizes of the center console 19 or center armrest. The support member 30 includes a pair of hinge arms 36 that extend rearwardly to pivotally engage the base 20. The support member 30 preferably is at an angle with respect to the base 20 when in the upright position and substantially parallel to the base 20 when in the storage position.

As shown in FIGS. 1 through 6 of the drawings, the base 20 is preferably a substantially flat structure formed to be positioned about a center console 19 or center armrest of a vehicle. The base 20 has an upper surface 26 and a lower surface 28, wherein the lower surface 28 of the base 20 is positioned adjacent the center console 19 or center armrest when utilized within the vehicle. The base 20 also preferably has a front broad portion 22 and a rear narrow portion 24 for providing increased stability when attached to the center console 19 or center armrest. The base 20 may be comprised of various shapes and sizes depending upon the model of the vehicle. It can also be appreciated that the base 20 may be comprised of any well known material such as plastic or metal.

Figure 3:
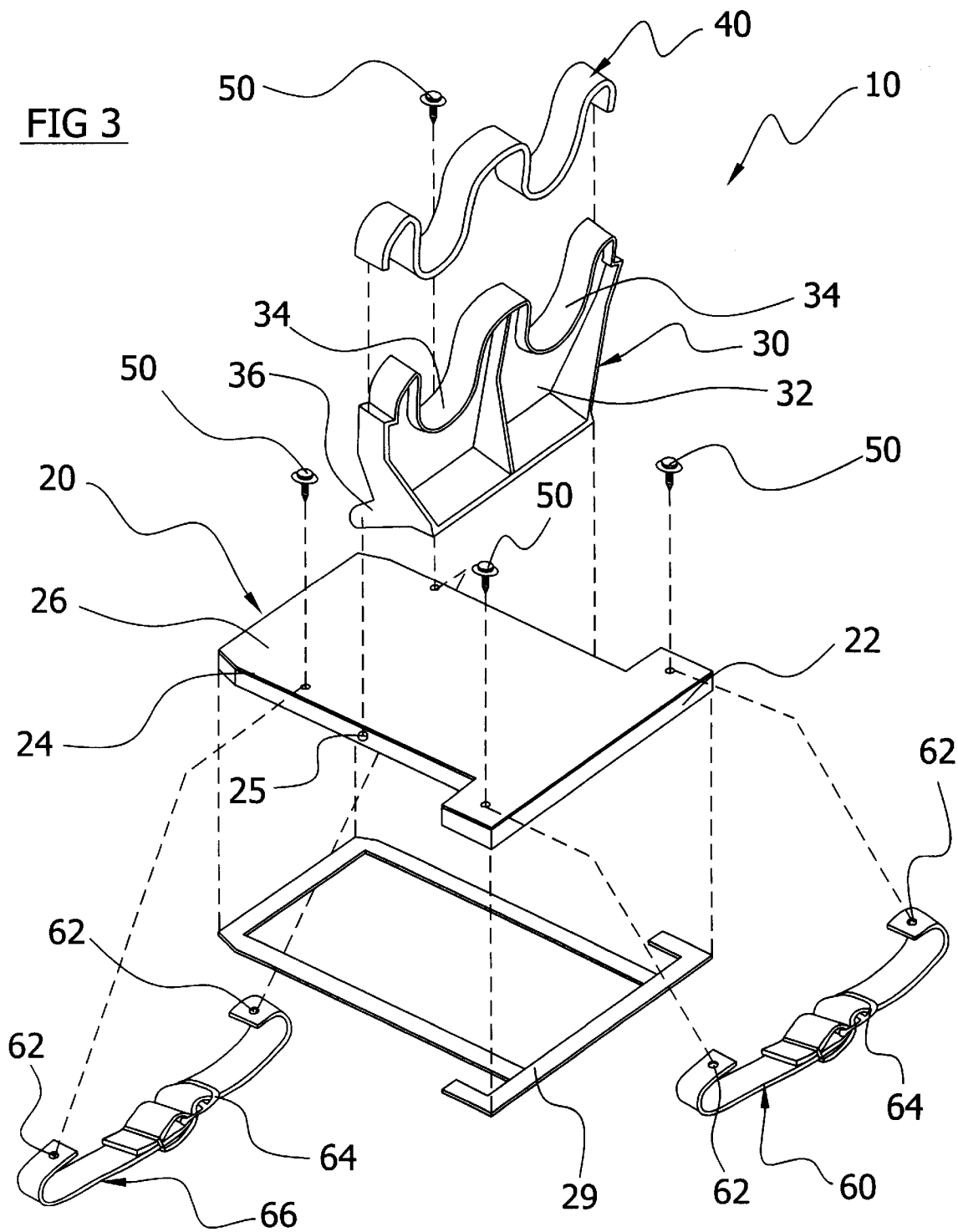
FIG. 3 is an exploded upper perspective view of the present invention.
Figure 4:
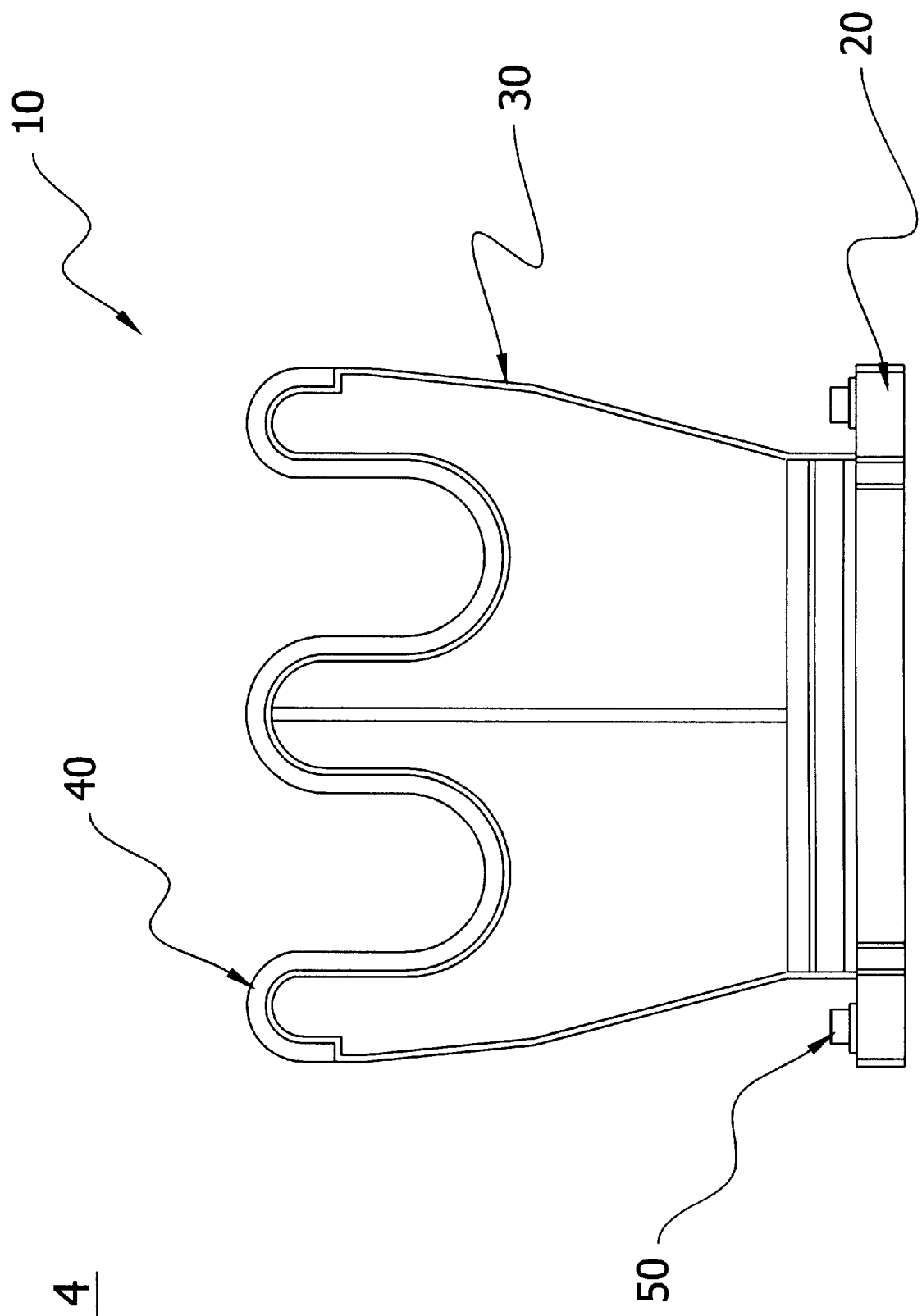
FIG. 4 is a front view of the present invention with the support member in an upright position.

As shown in FIGS. 3 and 7 of the drawings, a gripping gasket 29 is attached to the lower surface 28 of the base 20 for preventing marring and for gripping the surface of the center console 19. The gripping gasket 29 preferably extends along the perimeter of the base 20, however it can be appreciated that the gripping gasket 29 may be comprised of various shapes and sizes. The gripping gasket 29 is comprised of a gripping material such as rubber or other material.

As shown in FIGS. 3 through 6 of the drawings, a plurality of male snaps 50 are attached to the upper surface 26 of the base 20. The male snaps 50 may also be attached to the edges or lower surface 28 of the base 20. The male snaps 50 are preferably positioned near the corners of the base 20. The male snaps 50 removably receive a corresponding number of female snaps 62 50 that are secured to straps 60, 66. The male snaps 50 may be molded within the base 20 or threadably attached as shown in FIG. 3 of the drawings.

Figure 2:
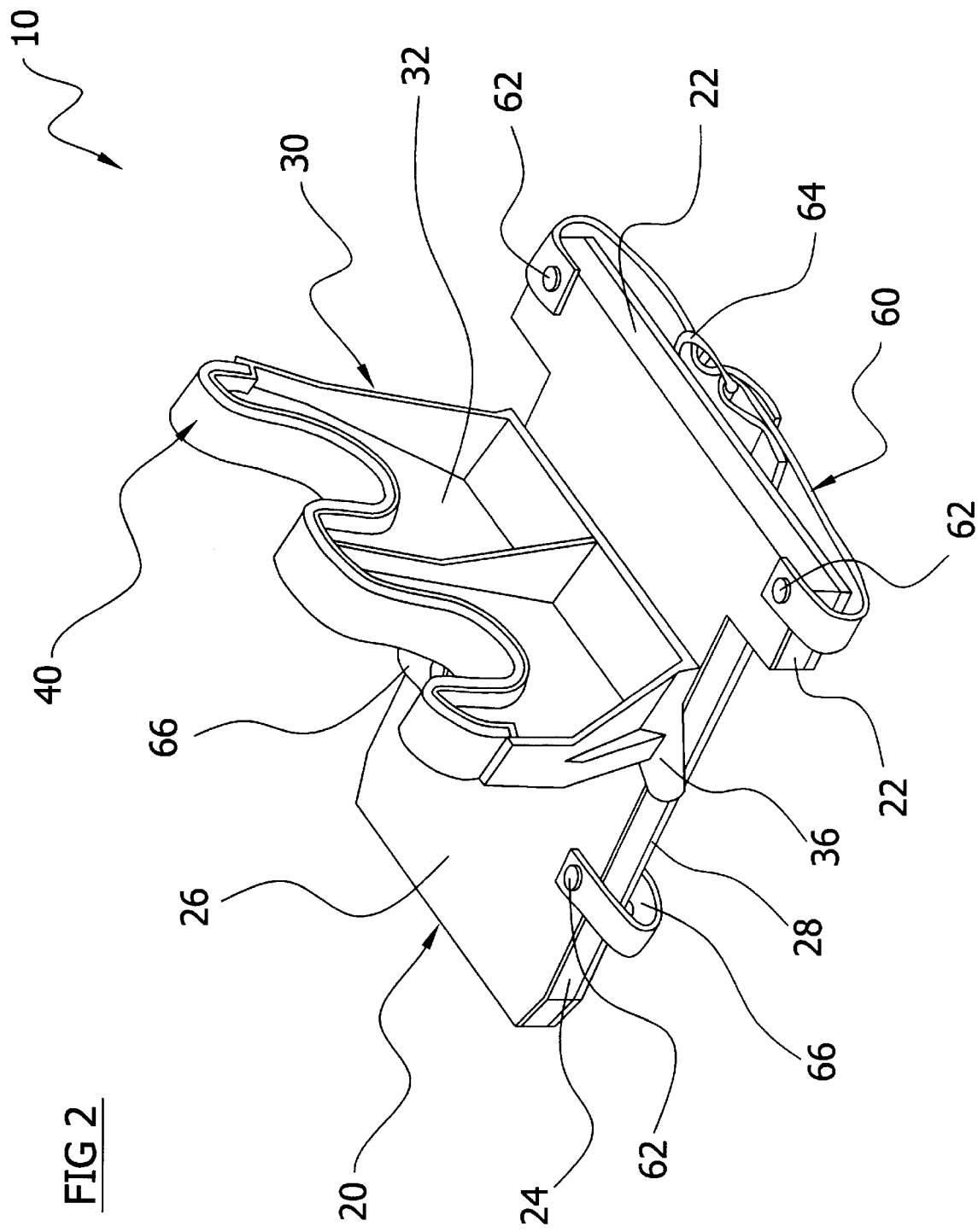
FIG. 2 is an upper perspective view of the present invention.

As shown in FIGS. 1 through 3 of the drawings, a first strap 60 and a second strap 66 are provided that are positionable about the cover of a center console 19 or about a center armrest. It can be appreciated that there can be additional straps depending upon the application.

As shown in FIGS. 2 and 3, the straps 60, 66 preferably have an adjustment portion 64 for allowing adjustment of the length of the straps 60, 66 for providing a snug fit about the center console 19 or center armrest. The distal ends of the straps 60, 66 include a corresponding plurality of female snaps 62 50 that removably mate with the male snaps 50 secured to the upper surface 26 of the base 20. The straps 60, 66 are preferably comprised of a flexible material such as nylon.

As shown in FIGS. 1 through 6 of the drawings, the support member 30 is pivotally attached to the base 20. The support member 30 is preferably attached to the narrow portion 24 of the base 20 positioned near the broad portion 22 of the support member 30. The support member 30 includes a body 32 having a frame structure.

As best shown in FIG. 3 of the drawings, the support member 30 preferably includes a pair of cutouts 34 within the upper portion of the support member 30 for receiving a stock 14 of the gun 12. The cutouts 34 are formed for allowing easy insertion and removal of a gun 12 from the cutouts 34. The cutouts 34 have a U-shape and are tapered for allowing various widths of stocks 14 of various types of guns 12.

It can be appreciated that there may be one or more cutouts 34 within the upper portion of the support member 30. A cushion 40 is preferably secured to the upper edge of the support member 30 and within the cutouts 34 for protecting the stock 14 of the gun 12 when position within. The cushion 40 is preferably comprised of a foam rubber material, however any resilient material may be utilized.

Figure 5:
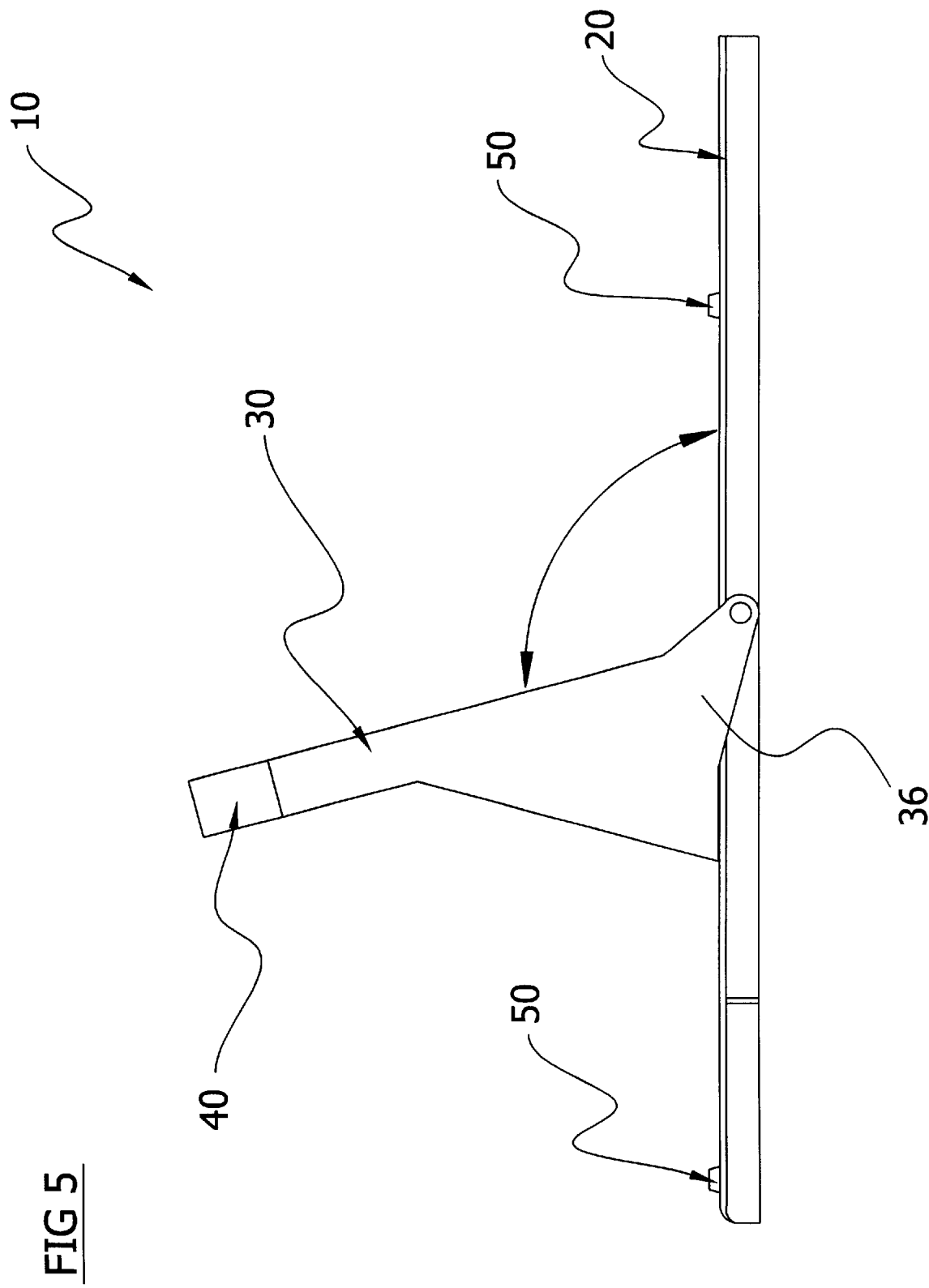
FIG. 5 is a side view of the present invention with the support member in an upright position.

As shown in FIGS. 2, 3, 5 and 6 of the drawings, the support member 30 includes a pair of opposing hinge arms 36. Each of the hinge arms 36 have a nub that extends toward the base 20 wherein the nub is received by a corresponding pair of apertures 25 within the side portions of the base 20. As best shown in FIG. 5 of the drawings, the hinge arms 36 extend rearwardly at an angle to pivotally engage the base 20.

Figure 6:
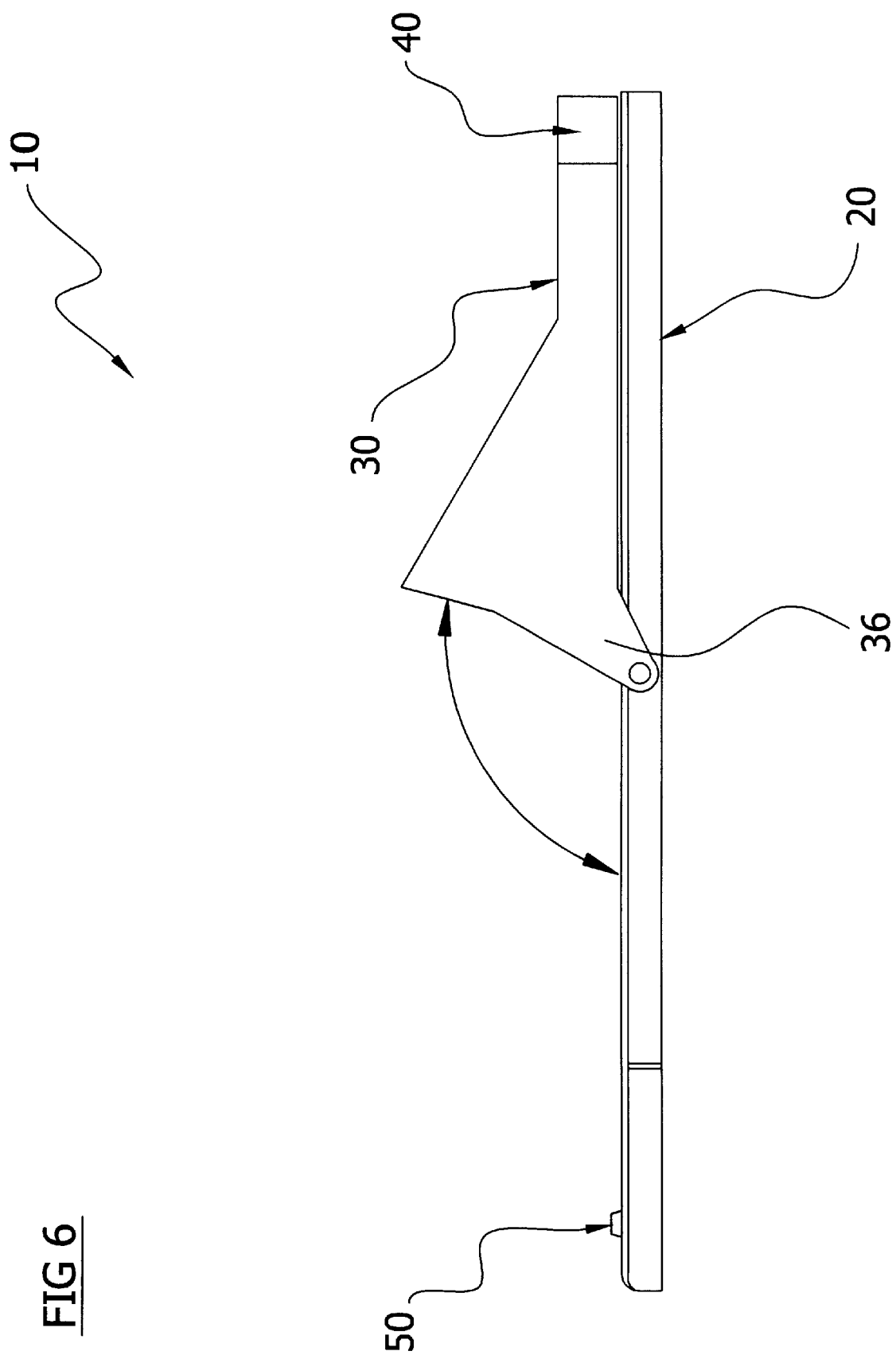
FIG. 6 is a side view of the present invention with the support member folded upon the base.

As further shown in FIG. 5 of the drawings, the support member 30 is preferably angled forwardly at an angle within respect to the base 20. The combination of the rearward hinge arms 36 along with the forwardly angled support member 30 require that the upper edge of the support member 30 be elevated prior to allowing the support member 30 to be folded into a storage position. The weight of the gun 12 maintains the support member 30 in a storage position. As shown in FIG. 6 of the drawings, the support member 30 is foldable upon the base 20 in a compact structure so as to not interfere with operation of the vehicle when not in use.

In use, the user positions the base 20 upon the cover of a center console 19 or center armrest. The user then adjusts the length of the straps 60, 66 so that the straps snugly retain the base 20 in the desired position. The user then mates the female snaps 62 50 of the straps 60, 66 with the male snaps 50 attached to the base 20 for securing the base 20 to the center console 19 or center armrest as shown in FIG. 1 of the drawings. It can be appreciated that the straps 60, 66 may extend about center console 19 or center armrest radially or longitudinally. The user then positions the support member 30 in the upright position as shown in FIG. 5 of the drawings. The lower edge of the support member 30 is supported against the upper surface 26 of the base 20 as shown in FIG. 5 of the drawings. The support member 30 preferably extends forwardly at an angle with respect to the base 20 for preventing folding of the support member 30 when a gun 12 is positioned upon the support member 30. The user then positions the stock 14 of the gun 12 within one of the cutouts 34 with the barrel 16 of the gun 12 supported by the floor of the vehicle as shown in FIG. 1 of the drawings. When the user removes the gun 12 from the inventive device, the user may fold the support member 30 upon the base 20 into a compact storage position as shown in FIG. 6 of the drawings. The user may then either maintain the inventive device upon the center console 19 or armrest, or they may position it within a storage location upon the vehicle until required.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle gun carrier system, comprising:
   a base;
   a means for securing said base within a vehicle; and
   a support member pivotally attached to said base for supporting a gun;
   wherein said support member includes a pair of hinge arms that are pivotally attached to said base, and wherein said pair of hinge arms extend rearwardly at an angle from said support member when said support member is in an upright position;
   wherein said support member is angled forwardly when in an upright position, and wherein said support member is aligned parallel to said base when positioned in a storage position.

2. The vehicle gun carrier system of claim 1, wherein said support member includes at least one cutout for receiving a stock of a gun.

3. The vehicle gun carrier system of claim 2, including a cushion secured within said at least one cutout.

4. The vehicle gun carrier system of claim 1, wherein said support member includes a pair of U-shaped cutouts.

5. The vehicle gun carrier system of claim 4, including a cushion secured within said at least one cutout.

6. The vehicle gun carrier system of claim 1, including a gripping gasket secured to a lower surface of said base.

7. The vehicle gun carrier system of claim 6, wherein said gripping gasket is positioned adjacent a perimeter of said base.

8. The vehicle gun carrier system of claim 1, wherein said base includes a broad portion and a narrow portion.

9. The vehicle gun carrier system of claim 8, wherein said narrow portion has a width less than a center console of a vehicle.

10. A vehicle gun carrier system, comprising
    a base;
    a support member pivotally attached to said base for supporting a gun; and
    at least one strap attached to said base;
    wherein at least one distal end of said at least one strap is attached to said base.

11. The vehicle gun carrier system of claim 10, wherein said at least one strap includes a pair of opposing fasteners that mate with a corresponding pair of fasteners upon said base.

12. The vehicle gun carrier system of claim 11, wherein said fasteners are comprised of female snaps and male snaps.

13. The vehicle gun carrier system of claim 10, wherein said support member includes at least one cutout for receiving a stock of a gun.

14. The vehicle gun carrier system of claim 13, including a cushion secured within said at least one cutout.

15. The vehicle gun carrier system of claim 10, including a gripping gasket secured to a lower surface of said base.

16. The vehicle gun carrier system of claim 15, wherein said gripping gasket is positioned adjacent a perimeter of said base.

17. The vehicle gun carrier system of claim 10, wherein said base includes a broad portion and a narrow portion.

* * * * *